Figure 1:
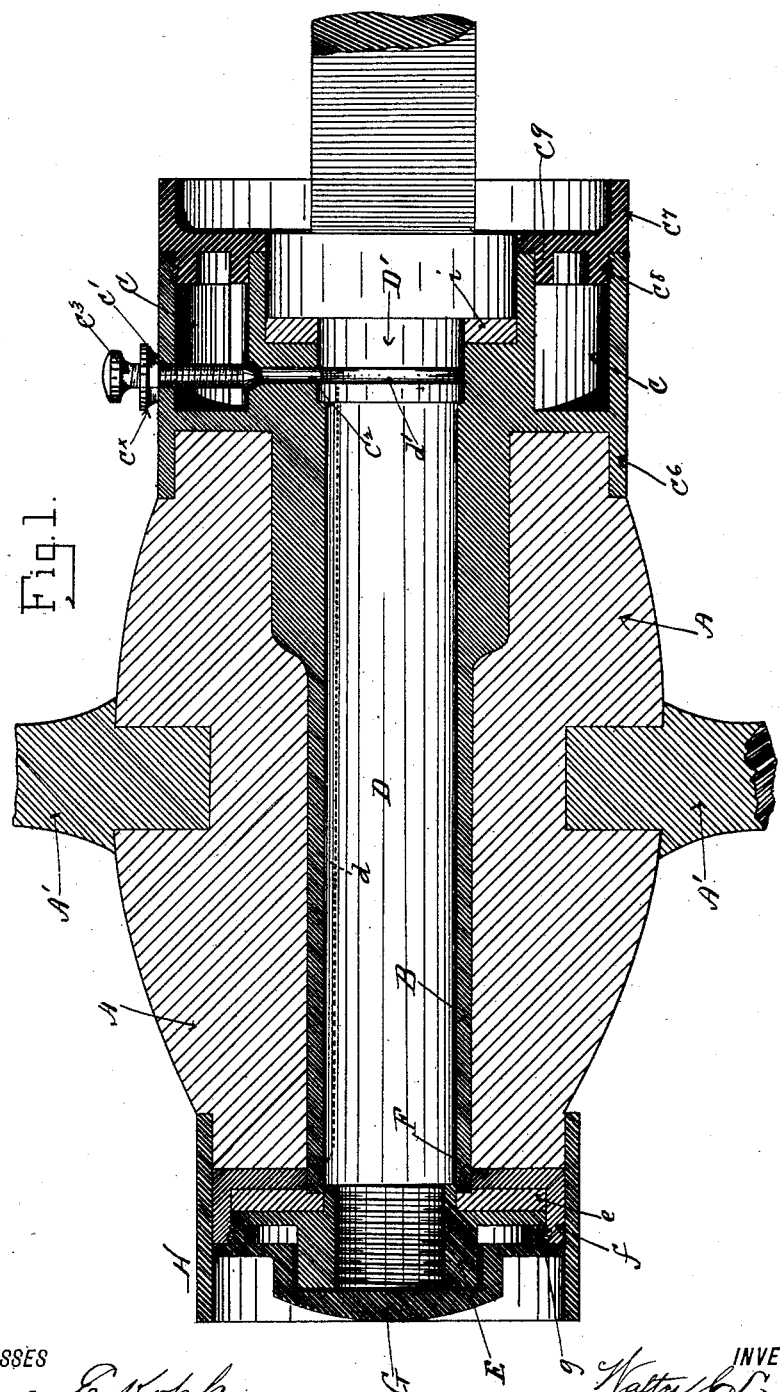

(No Model.)  2 Sheets—Sheet 1.

W. C. LUSSON.
AXLE LUBRICATOR.

No. 353,229.  Patented Nov. 23, 1886.

WITNESSES
Florence E. Kopp
P. C. Thatford

INVENTOR
Walter C. Lusson
by his Attorney
Thos. D. Moulds (No Model.) 2 Sheets—Sheet 2.
W. C. LUSSON.
AXLE LUBRICATOR.
No. 353,229. Patented Nov. 23, 1886.
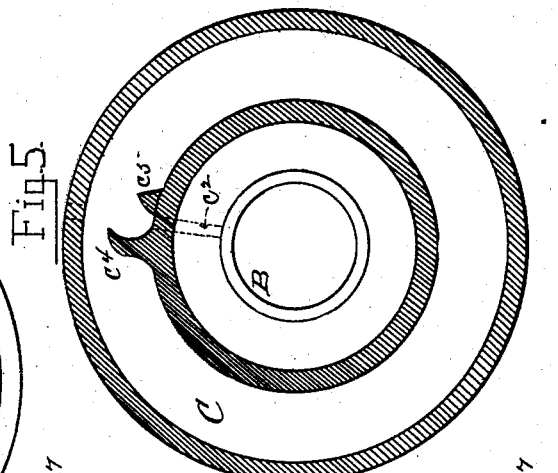
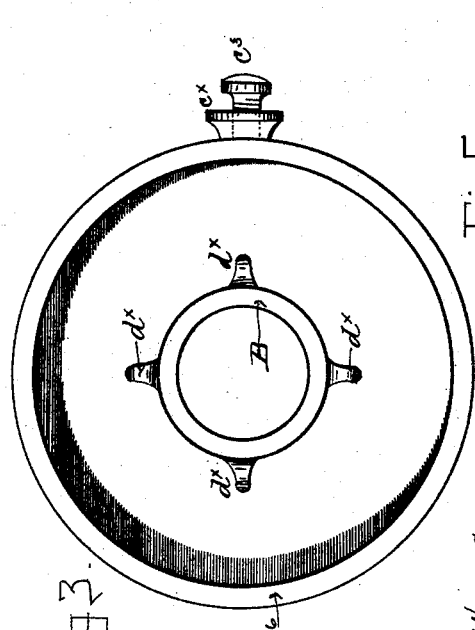
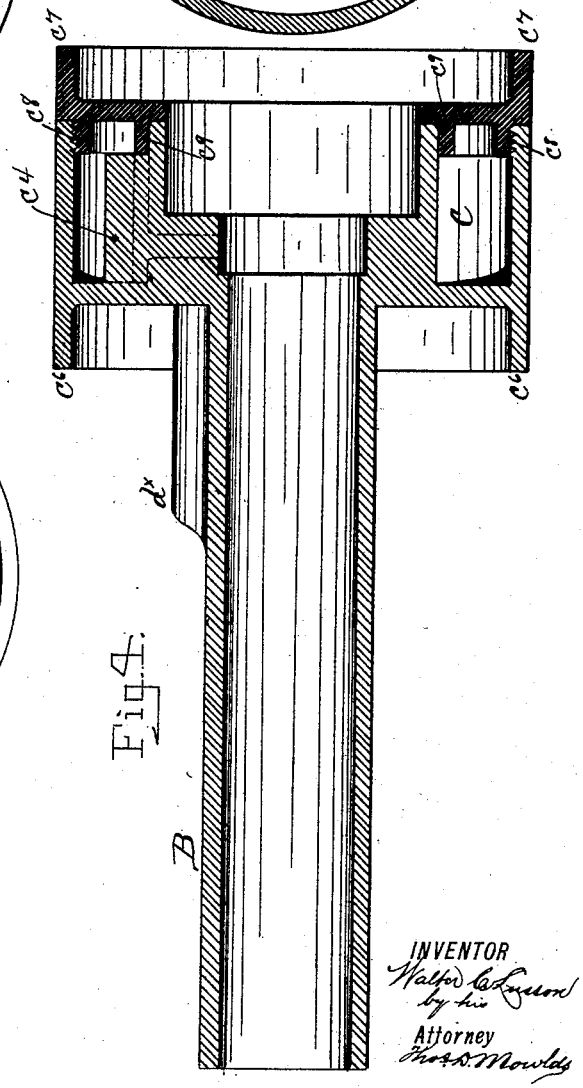
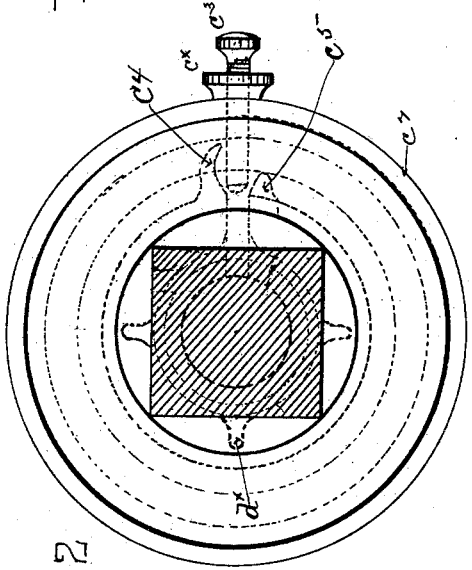
WITNESSES
B. C. Thatford
Florence E. Kopp
INVENTOR
Walter C. Lusson
by his Attorney
Thos. S. Mowlds

United States Patent Office.

WALTER C. LUSSON, OF PHILADELPHIA, PENNSYLVANIA.

AXLE-LUBRICATOR.

SPECIFICATION forming part of Letters Patent No. 353,229, dated November 23, 1886.

Application filed August 24, 1886. Serial No. 211,706. (No model.)

*To all whom it may concern:*

Be it known that I, WALTER C. LUSSON, a citizen of the United States, residing at Philadelphia, in the county of Philadelphia and State of Pennsylvania, have invented certain new and useful Improvements in Axle-Lubricators; and I do hereby declare the following to be a full, clear, and exact description of the invention, such as will enable others skilled in the art to which it appertains to make and use the same.

My invention relates to axle-lubricators; and the object of the invention is to provide a lubricator for oiling axles which can be manipulated from the exterior of the hub back of the spokes or web of the wheel, and which shall at each revolution of the wheel carry a suitable amount of lubricant into the joint or space between the axle and axle-box, and to provide means whereby the lubricant shall be evenly distributed over the entire surface of the spindle, and for preventing the escape of the lubricant from the front end of the hub.

In carrying my invention into practice I cast the axle-box and lubricator chamber or reservoir in a single piece, and provide a screw-cover for the rear end of the lubricator-reservoir, an extension of which also forms the band for the rear of the hub in lieu of the usual sand-band. I provide a set-screw for regulating the feed, and which can be taken out when the reservoir is to be filled. The set-screw is to be provided with a jam-nut, to be screwed down tight on the rim after the set-screw is properly regulated. The reservoir is provided with a cup or curved lip, which is placed on one side of the oil-hole, and which serves to carry the lubricant up on top of the axle every revolution of the wheel, and insures that the lubricant shall be properly delivered to the oil-hole or valve at each revolution of the wheel, whether there be much or little oil or lubricant in the reservoir. A smaller lip or projection on the opposite side of the valve or oil opening prevents the oil from falling back on that side. An annular channel is provided around the axle, registering with the oil-hole, in which the lubricant is received and carried round the hub, and a longitudinal channel in the spindle conveys the oil the full length of the spindle, and is kept continually full of oil, whereby the entire surface of the spindle is kept thoroughly oiled and a perfect circulation maintained. The front of the hub is provided with a cap which is screwed into an angle-plate, and lies inside of the band of the wheel. The vertical portion of the angle-plate is held in place by a washer and the nut which is screwed upon the end of the spindle.

Many minor details of construction will appear in the following description by figures and letters.

The accompanying drawings illustrate what I consider the best means for carrying my invention into practice.

Figure 1 is a central longitudinal section of a hub provided with my lubricating means. Fig. 2 is a rear elevation of the lubricating device, with the axle in cross-section and without the wooden portions of the hub. Fig. 3 is a front elevation of the lubricating device, showing it with the axle-box detached from all other parts. Fig. 4 is a central longitudinal section of the lubricator-reservoir and the axle-box. Fig. 5 is a transverse vertical section of the lubricator-chamber.

Similar letters of reference indicate corresponding parts in all the figures where they occur.

A is the wooden portion of the hub, and A' the spokes. (Shown broken off in Fig. 1.)

B is the axle-box, and C is the lubricant-reservoir, cast together. The lubricant reservoir or chamber is cast on the rear or inner end of the axle-box, and consists of an annular chamber, in which is provided an exterior and an interior opening, (marked, respectively, $c'$ and $c^2$.) Through the opening $c'$ in the exterior wall the lubricant is introduced into the reservoir, and through the opening $c^2$ in the interior wall it flows into the spindle. A set-screw, $c^3$, is provided to pass through the opening $c'$, which is threaded for that purpose. This set-screw forms a stopper for the opening $c'$ and a regulator for the flow of lubricant through the opening $c^2$, in conjunction with the edges or sides of which opening the set-screw $c^3$ forms a valve, which can be opened more or less, or entirely closed, if desired. To prevent the set-screw from being accidentally turned, a jam-nut, $c$, is set over it and screwed down tight upon the outer wall or rim of the lubricant-chamber after the feed has been properly adjusted by setting the screw $c^3$. On one side of the opening $c^2$, on the inner wall of the lubricant-chamber, I provide a cup or curved lip, $c^4$, which serves to gather a quantity of lubricant at each revolution of the wheel, and when the hole comes on top again the lubricant will be delivered to it in such manner as to cause it to be fed through said hole $c^2$. As shown, this lip or cup $c^4$ extends across the lubricant-chamber to the point where it meets the cover of said chamber. A smaller lip or projection, $c^5$, is placed upon the opposite side of opening $c^2$, and serves to more effectually deliver the oil into the hole $c^2$ and prevents it from being carried down that side of the chamber as the wheel is revolved. The outer wall of the reservoir is carried forward, as shown at $c^6$, and forms a band which rests over the rear end of the hub. The cover $c^7$ is separately formed, and is secured upon the reservoir by a screw-threaded annular flange, $c^8$, which engages screw-threads upon the interior of the outer wall of the reservoir. A second flange, $c^9$, fits over the interior wall of the reservoir, and a rear projection takes the place of the ordinary sand-band used upon hubs.

D is the spindle of the axle, which has the usual circular enlargement, D', at the rear end. This enlargement lies in the space formed by the oil-reservoir, and is provided with an annular groove or channel which registers with the opening or oil-hole $c^2$ and receives the lubricant therefrom. From this groove or channel the lubricant seeps out around the spindle and keeps the rear end thoroughly oiled. A longitudinal groove or channel, $d$, is provided in the spindle and communicates with channel $d'$, and extends the entire length of the spindle. This channel $d$ is kept constantly filled with oil from the reservoir, and affords a means for perfect circulation of the oil or lubricant around the spindle. The spindle being tapering from rear to forward end, the flow of lubricant through channel $d$ is natural and sure, as the lubricator chamber or reservoir is situated at the rear or broader end of the spindle. This would not be the case in constructions where the lubricator chamber or reservoir is located in front of the spokes or web of the wheel. The front end of the spindle receives the nut or tap E in the usual way, with a washer, $e$, between its flange and the end of the axle-box. An angle-plate, F $f$, is placed back of the washer $e$, and is held in place thereby, while its horizontal flange $f$ extends forward past the flange on the nut or tap, and is internally screw-threaded at this forward end to receive the screw-threaded flange $g$ of a cap, G, which is screwed tightly up against the parts and forms a confining means for the oil at the front end of the hub.

A band, H, is set over the end of the wooden portion A of the hub and extends out over the nut, angle-plate, and cap.

A washer, $i$, may be placed between the end of the axle-box and the enlargement D' of the spindle.

The exterior of the axle-box is preferably furnished with radial wings $d^\times$, which take into the wood of the hub and prevent the box from turning therein. These wings, as shown, only extend a portion of the length of the hub.

The lubricating device can be placed on any wheel-vehicle when made or when already in use. The circulation of the oil or lubricant about the spindle is perfect, the entire surface of the spindle being kept in an unctuous state by reason of the longitudinal groove or channel.

The cap G prevents the nut or tap from being unscrewed when the vehicle is backed or the wheel turned in a direction opposite to that of progression. At the same time this cap prevents the oil from oozing out at the front part of the hub, and the space between the nut and the cap may act as a reservoir for refuse oil which works into it, and may be cleared away by simply removing the cap; but, as will be readily seen, the cap may be omitted, if desired.

As a rule, the wheel need not be removed, except at long intervals, when a lot of dead and gummy oil has accumulated and it is desired to clean it off; but when it is desired to remove the wheel it is apparent that it may be done readily in the ordinary manner, by unscrewing the cap and the nut or tap.

As already stated, the lubricator-reservoir being located on the inner end, insures the flow of oil with the taper of the axle and not against it, as is the case with those which lubricate from the outside of the hub.

The lubricator-reservoir may be cleaned by removing the set-screw and turning the hub in the proper position to bring the opening $c'$ underneath.

Having thus described my invention, what I claim, and desire to secure by Letters Patent, is—

1. In an axle-lubricator, the combination, with the axle-box and lubricator-chamber cast in a single piece, of the cap or cover for said chamber screwed into the walls thereof and extended back to form the band for the hub and axle, as set forth.

2. In an axle-lubricator, a lubricator-chamber having its outer wall or shell carried forward to form a band for the wooden portion of the hub, and a removable end cap or cover for said chamber, as set forth.

3. In an axle-lubricator, a lubricator chamber or reservoir extending entirely around the spindle and provided with an opening in its outer wall and another in its inner wall, and a set-screw with jam-nut upon it to act as a stopper for the outer opening and as a valve or regulating means for the inner opening, as set forth.

4. In an axle-lubricator, an annular lubricator-chamber provided with an opening extending to the axle-space, and a cup or lip formed or secured upon one side of said opening, as and for the purpose set forth.

5. In an axle-lubricator, an annular lubricator-chamber having an opening to the axle-space within and a cup or lip on one side of said opening, and a smaller lip or projection on the other side of said opening, as and for the purpose set forth.

6. In an axle-lubricator, the combination, with the lubricator-chamber having a discharge-opening, of the spindle having an annular groove or channel registering with said opening in the interior wall of the lubricator-chamber, and a longitudinal channel or groove on top of, extending the full length of, the spindle and communicating with the annular groove or channel.

7. In a lubricator for axles, the combination, with the spindle and nut thereon, of the angle-plate F f, and the cap G g, screwed into said angle-plate, as set forth.

In testimony whereof I affix my signature in presence of two witnesses.

WALTER C. LUSSON.

Witnesses:
CHARLES E. LEX, Jr.,
THOS. D. MOWLDS.